Jan. 11, 1966  R. A. LANCASTER  3,228,615
APPARATUS FOR WINDING TAPPED COILS
Filed July 23, 1962  8 Sheets-Sheet 1

INVENTOR
R. A. LANCASTER
BY
ATTORNEY

INVENTOR
R. A. LANCASTER
BY
ATTORNEY

INVENTOR
R. A. LANCASTER
BY
ATTORNEY

Jan. 11, 1966 R. A. LANCASTER 3,228,615
APPARATUS FOR WINDING TAPPED COILS
Filed July 23, 1962 8 Sheets-Sheet 5

INVENTOR
R. A. LANCASTER
BY
ATTORNEY

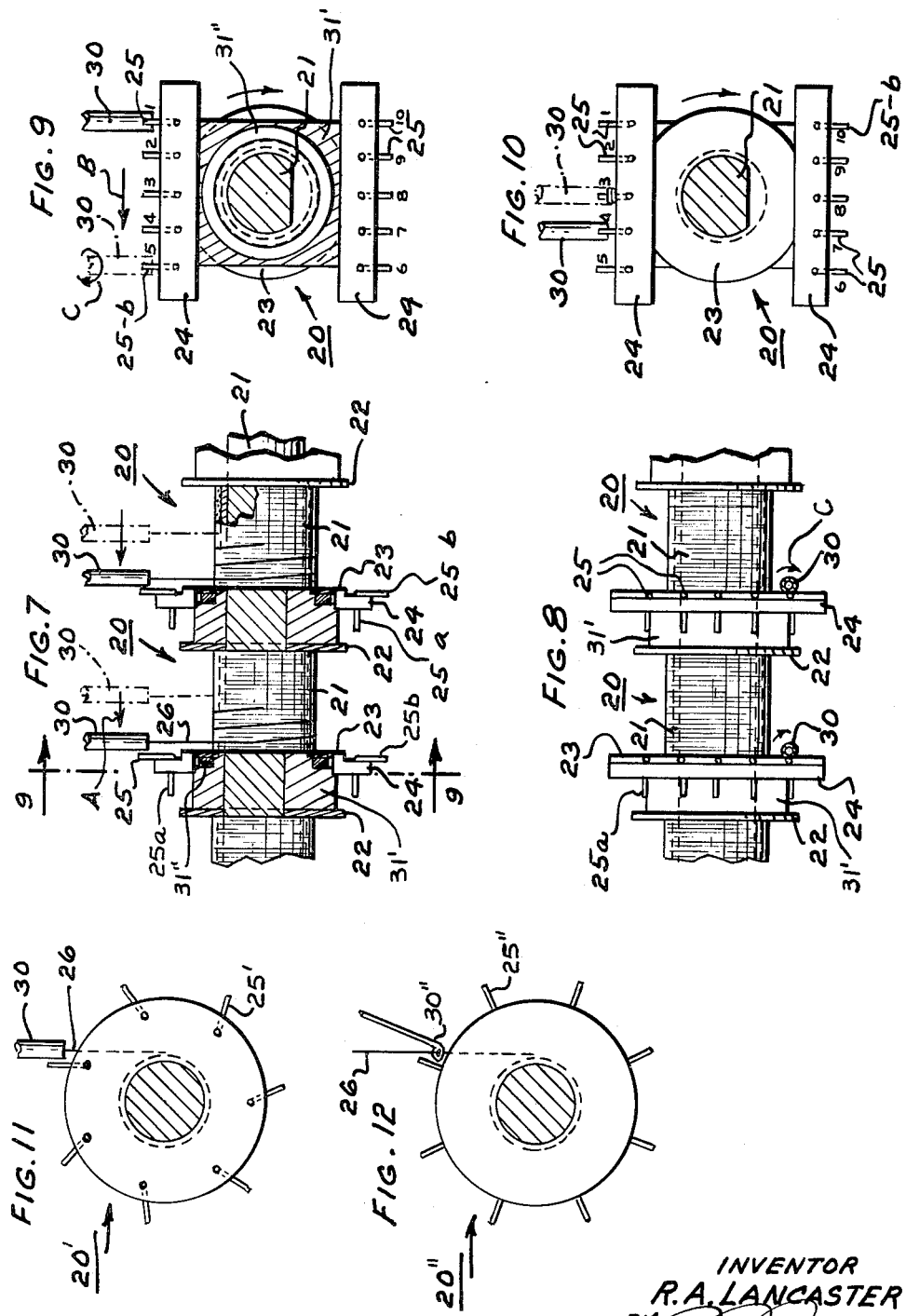

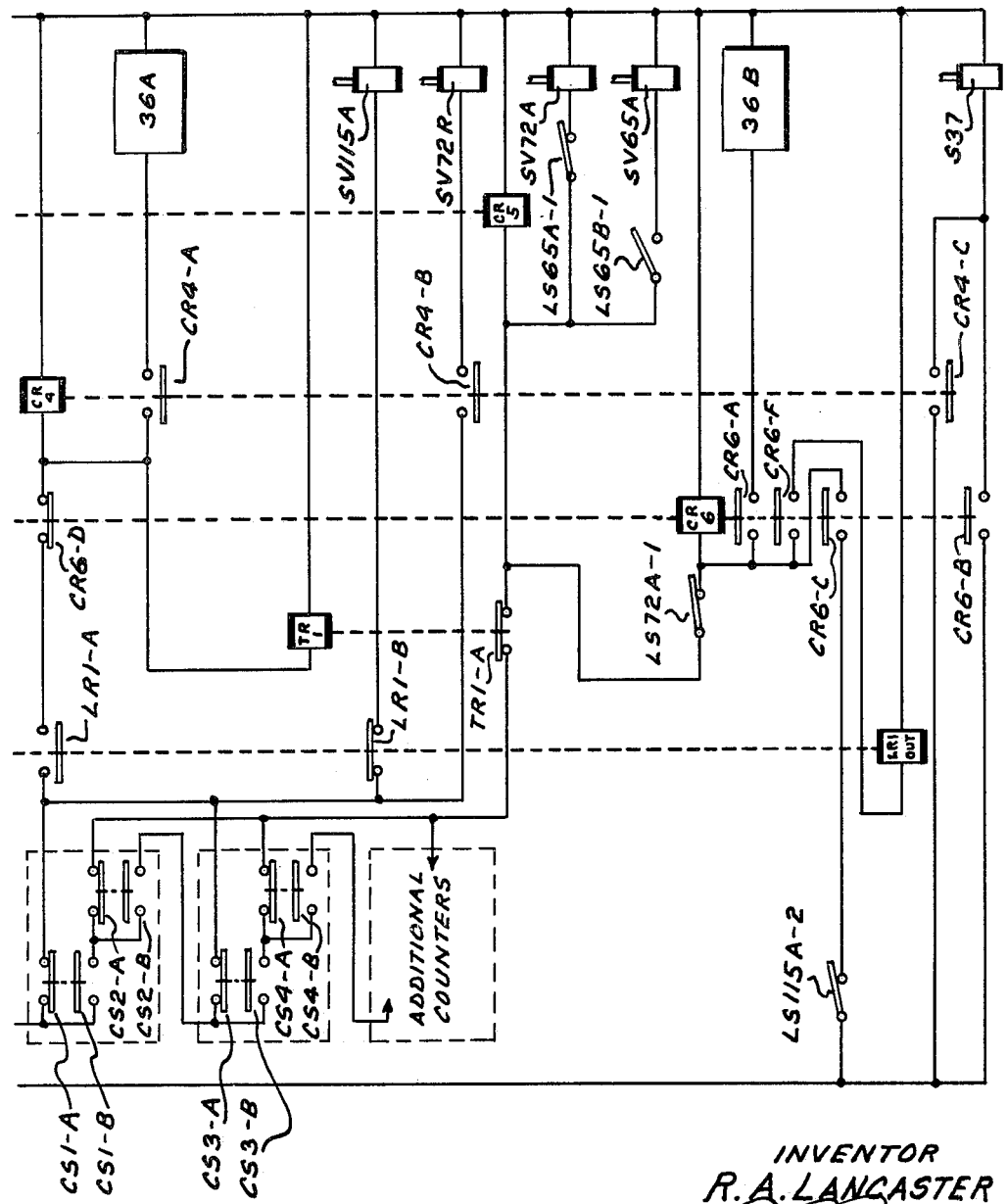

United States Patent Office 3,228,615
Patented Jan. 11, 1966

3,228,615
APPARATUS FOR WINDING TAPPED COILS
Robert A. Lancaster, Indianapolis, Ind., assignor to Western Electric Company, Incorporated, New York, N.Y., a corporation of New York
Filed July 23, 1962, Ser. No. 211,629
21 Claims. (Cl. 242—7)

The present invention relates generally to methods and apparatus for winding tapped coils, and to certain related apparatus for wrapping a wire about a post. More particularly, the invention relates to the winding of multiply tapped coils on headed spools, with individual coil portions having wire extending therefrom wrapped about terminal posts on the spool head to provide convenient taps for the coil portions. Accordingly, the general objects of the invention are to provide new and improved methods and apparatus of such character.

Another object of the invention is to provide new and improved methods and apparatus for automatically and simultaneously winding a plurality of identical multiply tapped coils on headed spools such that the individual coil portions have predetermined numbers of turns and such that leads from the coil portions are wrapped about selected terminal posts mounted on the spool heads according to a preset program of operation.

A further object of the invention is to provide improved apparatus for wrapping a wire about a post, particularly for simultaneously wrapping a plurality of wires about an equal number of parallel terminal posts to form taps for coils wound in accordance with the invention.

The foregoing and other objects are accomplished, according to a preferred embodiment of the invention, by causing relative rotation and traversing movement between a headed spool and a wire guide to wind wire on the spool. When a predetermined number of turns has been wound on the spool, the rotational and traversing movements are stopped, after which the spool and wire guide are revolved relative to each other to wrap the wire extending from the end of the coil about a terminal post mounted on one of the spool heads and thereby provide a tap for the coil. The wire guide is moved relative to the spool to a position adjacent to the terminal post before the revolving step.

Multiply tapped coils are wound in this manner by alternating the winding and revolving steps, preferably with the spool being rotated and the wire guide traversing axially of the spool. In this case, the wire guide is moved along the line of traverse to a first rest position where the wire lies adjacent to the spool head bearing the terminal post at or before the time that the coil winding step has been completed, after which the wire guide is moved in a plane perpendicular to the line of traverse to a second rest position adjacent to a selected terminal post for revolution about that post to wrap the wire thereabout.

Preferably a large number of identical coils are automatically wound at the same time according to a predetermined program of operation. The formation of many taps at the same time is preferably accomplished by mounting all of the wire guides for parallel movement on a single base which is caused to revolve in a fixed attitude, by an eccentric mechanism, in a small circular path. Such movement of the base in turn revolves all of the wire guides, as a unit, about selected terminal posts on the associated spools.

Other objects, advantages and features of the invention will be apparent from the following detailed description of specific embodiments thereof, when taken in connection with the accompanying drawings, in which:

FIG. 7 is an enlarged fragmentary front elevational view illustrating the preferred construction of the spools and wire guides, and depicting particularly the method steps of the invention;

FIG. 8 is a top plan view of the winding unit illustrated in FIG. 7;

FIG. 9 is a left-side view of one of the winding units, looking generally along the line 9—9 of FIG. 7;

FIG. 10 is a view similar to FIG. 9, but showing the winding unit in a different operating position;

FIG. 11 is a view similar to FIGS. 9 and 10, but illustrating the application of the invention to a different type of spool;

FIG. 12 is a view similar to FIG. 11, but showing still another type of spool; and FIGS. 13 and 14, together, constitute a schematic diagram of a simplified electrical control circuit for operating the apparatus illustrated in FIGS. 1 through 6.

Figure 1:
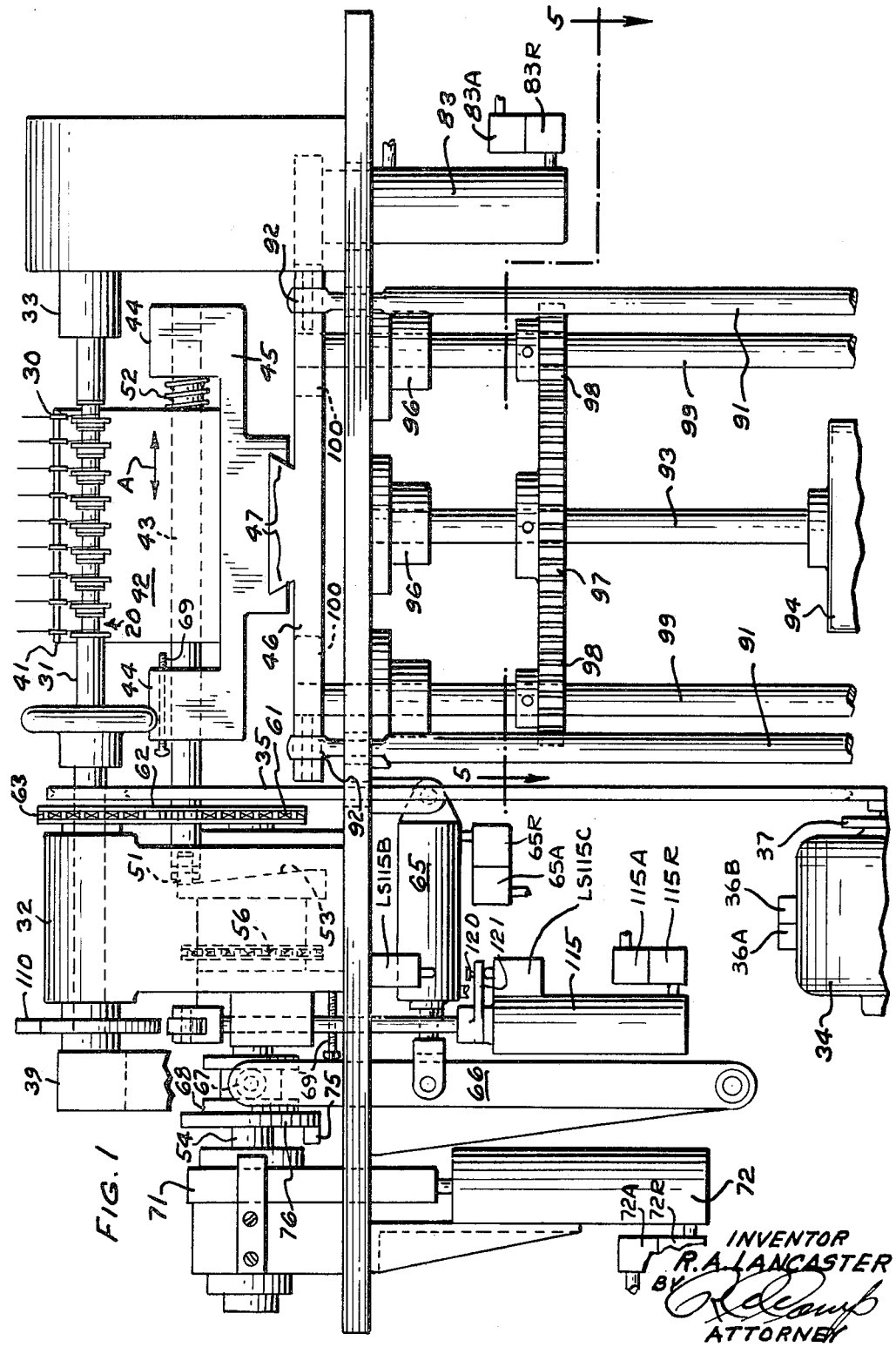
FIG. 1 is a front elevational view, partially broken away, of a complete automatic coil-winding apparatus constituting a preferred embodiment of the invention.

In the following detailed description of the invention, the basic method steps and mechanical movements will first be described with reference to the simplified, somewhat diagrammatic views constituting FIGS. 7 through 10. Following that, the alternative embodiments of FIGS. 11 and 12 will be considered under the heading "Alternative Embodiment," after which the specific preferred automatic apparatus for practicing the invention (FIGS. 1 through 6) will be described under the heading "Automatic Winding Equipment," and finally the operation of that equipment will be described under the heading "Control Circuit and Operation," with reference to the control circuit of FIGS. 13 and 14.

METHODS AND MECHANICAL MOVEMENTS

Referring now in detail to FIGS. 7 through 10 of the drawings, in accordance with a preferred application of the invention a plurality of multiply tapped coils are wound simultaneously on a plurality of axially aligned spools 20. Although the invention is applicable to the winding of but a single spool at a time, one of the most significant advantages of the invention is that it enables the simultaneous automatic winding of a rather large number of identical coils according to a predetermined program. Conveniently, from ten to twenty coils may be wound at one time; but since the basic steps and movements are essentially the same for each individual coil, the following description will be concerned primarily with the winding of a single coil.

The preferred type of spool 20 includes a drum 21, on which wire is wound in a succession of overlying coil portions between a pair of spool heads 22 and 23. In the specific embodiment shown, the spool head 23 has secured thereto or formed integrally therewith a pair of parallel, elongated terminal strips 24, each carrying five L-shaped terminal members, designated generally by the numeral 25. As best illustrated in FIG. 7, each terminal member 25 has an axially extending leg or prong 25-a, which is secured to the associated terminal strip 24, and a generally radially extending leg or terminal post 25–b, which projects beyond the outer edge of the terminal strip 24 along the inner surface thereof.

After the winding of each individual coil portion on the drum 21, the wire extending from the end thereof is wrapped about a selected one of the terminal posts 25–b to provide a tap for the coil just wound. The axially extending legs or prongs 25–a of the terminals 25 permit plugging of the finished coil into circuit boards or other external circuit components having sockets for receiving the prongs. While the specific type of L-shaped terminal 25 just described is highly preferred for certain compact, multiple inductor coils used in the telephone industry, various other designs are serviceable. The most important criterion is that the terminal post be mounted on a head of the spool and lie in a plane generally perpendicular to the axis of the spool, so that the wire extending from the end of the coil may be wrapped thereabout to form a tap for the coil, although the terminals are preferably arranged in a row, in parallel, spaced relationship.

In practicing the invention in its preferred form, the spool 20 is first rotated about its axis to draw a wire 26 thereon through a traversing wire guide 30. The wire guides encircle the wire 26, and are preferably in the form of close-fitting sleeves such as are illustrated. As is customary in the winding art, the wire guide 30 traverses, or reciprocates axially of the spool 20, as the spool rotates to guide the wire 26 to the spool, so as to form a coil on the drum 21 between the spool heads 22 and 23. The traverse should be synchronized with the rotation to wind the wire evenly in closely packed helical turns. While it is preferred to rotate the spool 20 and reciprocate the guide 30, other arrangements could be utilized, the important criteria being relative rotation and relative traverse between the spool and wire guide to wind the wire on the drum of the spool.

When a predetermined number of turns desired for a coil portion has been wound, the rotation of the spool is stopped, preferably with the spool in an exact predetermined angular orientation (as illustrated in FIG. 9), such that the terminal posts 25–b are parallel to the wire guide 30. Shortly before the time that the rotation of the spool 20 is terminated, the wire guide 30 may be traversing in either direction and may be located at any position along the axis of the spool, depending on the number of turns to be wound. A typical position is that illustrated in phantom lines in FIG. 7. Prior to the time that the rotation of the spool 20 ceases and a particular coil portion is fully wound, the wire guide 30 is moved along the line of traverse (arrow A in FIG. 7) to a first rest position (shown in solid lines in FIG. 7) where the wire 26 lies adjacent to the spool head 23 bearing the terminal post 25–b.

As will be discussed in detail hereinafter, these movements are preferably accomplished by rotating the spool 20 at a high speed (for example 3000 r.p.m.) during the major portion of the coil-winding operation, and then temporarily interrupting the rotation when only a few turns remain to be wound, for example two turns prior to the desired number of turns. With the rotation temporarily stopped, the wire guide is shifted to the first rest position, after which the spool is rotated at a slow speed (such as 60 r.p.m.) to complete the last few turns, and is stopped in the prescribed orientation.

With this particular arrangement, the wire is usually wound at a wide pitch angle leading toward the spool head 23 during the last few turns, as depicted in FIG. 7, rather than in closely packed turns as in the major portion of the winding. This is not particularly detrimental, and is required by the necessity of ending the winding after a predetermined number of turns and with the wire 26 adjacent to the spool head 23. The important criterion is that each coil portion, immediately after winding, terminate with the wire 26 adjacent to the head 23 containing the terminal posts 25–b. Obviously, both spool heads can be provided with terminal posts, and the guide 30 can then be moved toward whichever head supports the particular terminal it is desired to use at a particular stage in the winding.

The solid-line position of the wire guide in FIG. 9 corresponds to the solid-line position of FIGS. 7 and 8, and is the end-of-winding position. After winding has stopped and the first rest position has been reached, the wire guide 30 is moved in a plane perpendicular to the line of traverse to a second rest position adjacent to a selected post terminal 25–b; for example, as indicated by arrow B in FIG. 9, to the position shown in phantom lines. When the lower terminal strip 24 in FIG. 9 is to be used, the stopped position of the spool is exactly 180° displaced from that shown in FIG. 9.

After the second rest position has been reached, the wire guide 30 is revolved about the selected terminal post 25–b, as indicated by the arrow C in FIGS. 8 and 9, to wrap the wire extending from the end of the coil several turns about the terminal post 25–b. In this manner, the wire is firmly secured to the terminal post 25–b to provide a tap for the coil.

The wire guide is then returned to the normal traversing position in preparation for the winding of another coil portion on the same spool, which will overlie preceding coil portions. Rotation of the spool is then recommenced, along with the desired axial reciprocation of the wire guide 30. Preferably, the wire guide 30 is returned to the first rest position, after the formation of each tap, the coil portion laid down in the ensuing coil-winding operation thereby starting next to the spool head 23.

In this manner a multiply tapped coil of special design is wound, characterized particularly in that the wire at the end of each coil portion (1) extends outward from the coil portion, from a point adjacent to the spool head, (2) is wrapped about a selected terminal post attached to the spool head and lying in a plane perpendicular to the axis of the spool, and (3) extends from the tap inward along a line adjacent to the spool head to provide the beginning of a succeeding coil portion. In a simplified illustrative example, a ten-tap spool is wound, with the taps being numbered sequentially from right-to-left along the top terminal strip 24 of FIG. 9 and from left-to-right along the bottom strip. The outer diameter of the wire guide sleeve 30 is such that it may pass readily between adjacent terminal posts 25–b in the row to wrap the wire about any selected terminal post, the posts being preferably notched to assist in holding the wire thereon.

The winding patterns may be more complicated than the illustrated example; and either bare or insulated wire coils may be wound. Where insulated wire is used, it may be either enamelled or plastic insulated, preferably polyurethane insulated. Successive coil portions may either be electrically independent of each other, or may be successive tapped portions of a continuous coil as just described. A combination of independent and electrically connected coil portions may also be provided. Where independent coils are to be wound, the wire is wrapped about one terminal post, for example as depicted in phantom lines in FIG. 10, to provide a tap at the end of the coil just wound. Next, the wire guide 30 is moved to a position opposite to another terminal post, for example as shown in solid lines in FIG. 10, and the wire is wrapped about that post to provide an initial tap for the next coil to be wound. Later, the short wire length extending between the two consecutively wrapped terminal posts is severed to isolate the coils.

Thus, by properly programming the operation, all coils or coil portions desired for a single instrument may automatically be wound on a single plastic spool, which is typically about half the size of that shown in FIGS. 7 through 10. Then, after finishing operations, the entire coil unit may be plugged into a circuit board by the prongs 25–a. The insulated wire is preferably connected electrically to the terminal posts 25–b by a later solder dipping operation, wherein only the short posts 25-b are immersed and wherein the solder melts the insulation locally and joins the then bare wire both electrically and mechanically to the posts.

In one specific example, three inductor coils are wound on each spool 20, two separate coils and one multitap coil, according to the following program (the terminals being numbered 1 through 10 as in FIG. 10 and terminal 5 being blank):

Coil I.—Terminal 4, 33½ turns, terminal 7; (thence to)
Coil II.—Terminal 6, 867 turns, terminal 8, 91 turns, terminal 9, 101½ turns, terminal 2, 110½ turns, terminal 3; (thence to)
Coil III.—Terminal 1, 66½ turns, terminal 10.

ALTERNATIVE EMBODIMENTS

An alternative form of spool 20', illustrated in FIG. 11, is identical to the spool 20 of FIGS. 7 through 10 with respect to the drum and the spool heads; however, the terminal strips 24 are omitted and the terminals 25' are set directly in the spool head 23' in a circular row, rather than in a straight row. Since it is desired that the wire guide 30 extend substantially tangentially with respect to the drum of the spool 20', the terminals 25' deviate by a substantial angle from a radial orientation such that they may be parallel to the wire guide 30, as illustrated in FIG. 11.

A further embodiment 20" of the spool, shown in FIG. 12, is identical to the spool 20' with the exception that each of the terminals 25" is arranged in a radial orientation. This is permitted by virtue of the fact that a wire guide 30" is employed which extends substantially radially of the spool 20' even though the wire 26 is tangent to the drum of the spool and is therefore at a substantial angle with respect to a radial orientation. This in turn is permitted by the fact that the effective portion of the wire guide 30' has a ring or eyelet at its free end. This is in contrast to the wire guide sleeve 30 which is preferably employed in association with the spools 20 and 29'.

With use of either of the spools 20' or 20", it is unnecessary to move the wire guide 30 or 30" relative to the spool to bring the wire guide and the wire to a position adjacent to the selected terminal 25' or 25". Proper relative position of wire guide and selected post for the wrapping operation is obtained by stopping the rotation of the spool with the selected one of the terminals exactly opposite the wire guide.

AUTOMATIC WINDING EQUIPMENT

Figure 2:
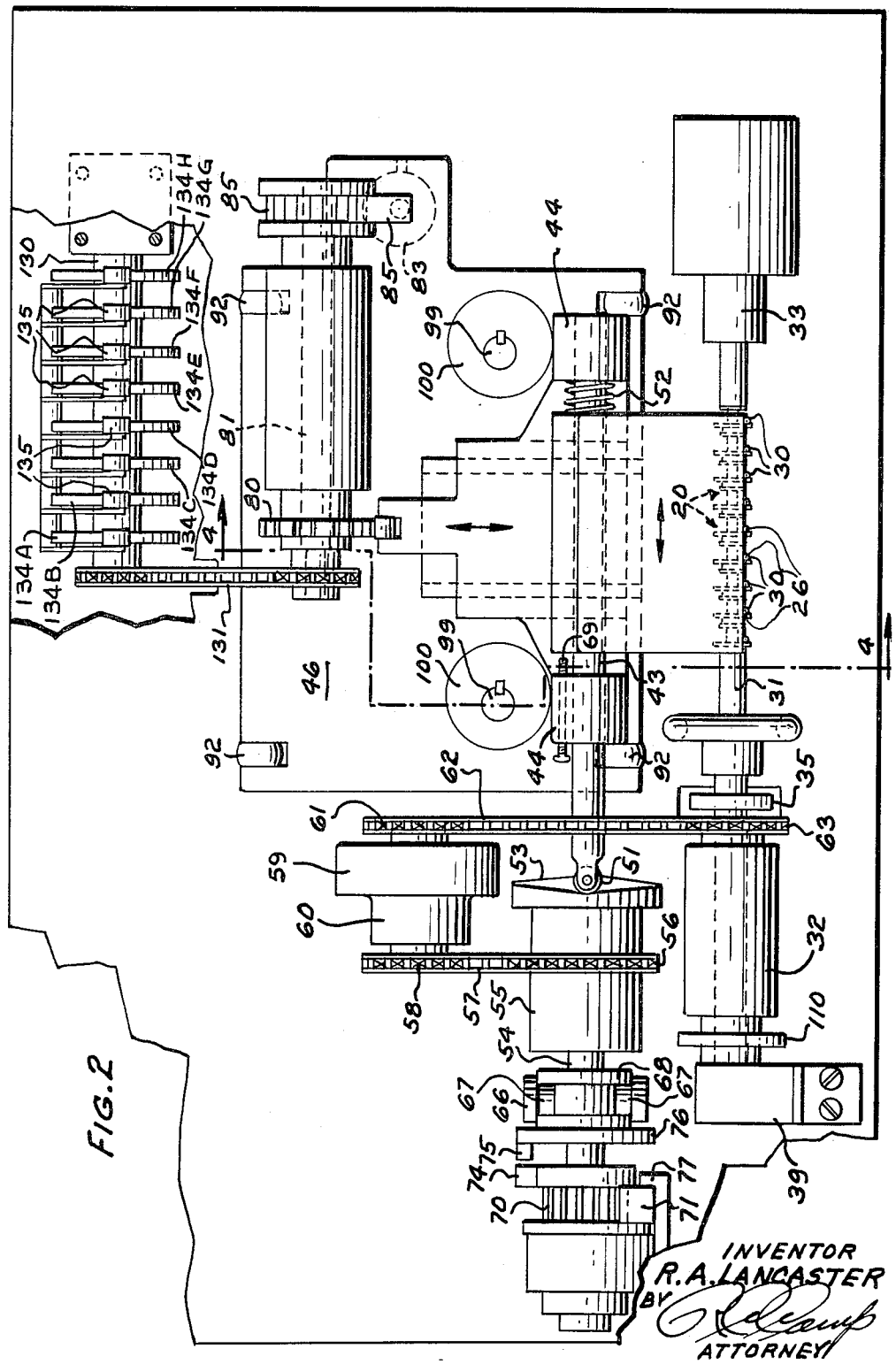
FIG. 2 is a plan view, partially broken away, of the same apparatus.

Referring now to FIGS. 1 and 2, a group of spools 20 is mounted in axial alignment on a power-driven arbor or spindle 31 for rotation therewith. While eight spools 20 are shown, the number may be substantially larger where large scale production is desired.

Spool rotation

As best illustrated in FIGS. 7 and 9, the arbor 31 has a flattened bottom for reception within similarly shaped apertures in a group of spacer members 31'. Each spool 20 is mounted on a spacer member, and a compressible washer 31" attached to the spacer member urges the spool to the left, as viewed in FIG. 7 against the edge of the next spacer member. With this arrangement the positions of the spools along the lengths of the spacer members are precise, the spindles are dependent upon the lengths of the accurately machined spacers 31' rather than the relatively irregular lengths of the spools themselves.

Referring again to FIGS. 1 and 2, the spindle 31 is mounted in a bearing 32 and a retractable spindle support 33, the latter permitting rapid removal of a detachable portion of the spindle for convenient removal of completed coils and application of empty spools.

Figure 3:
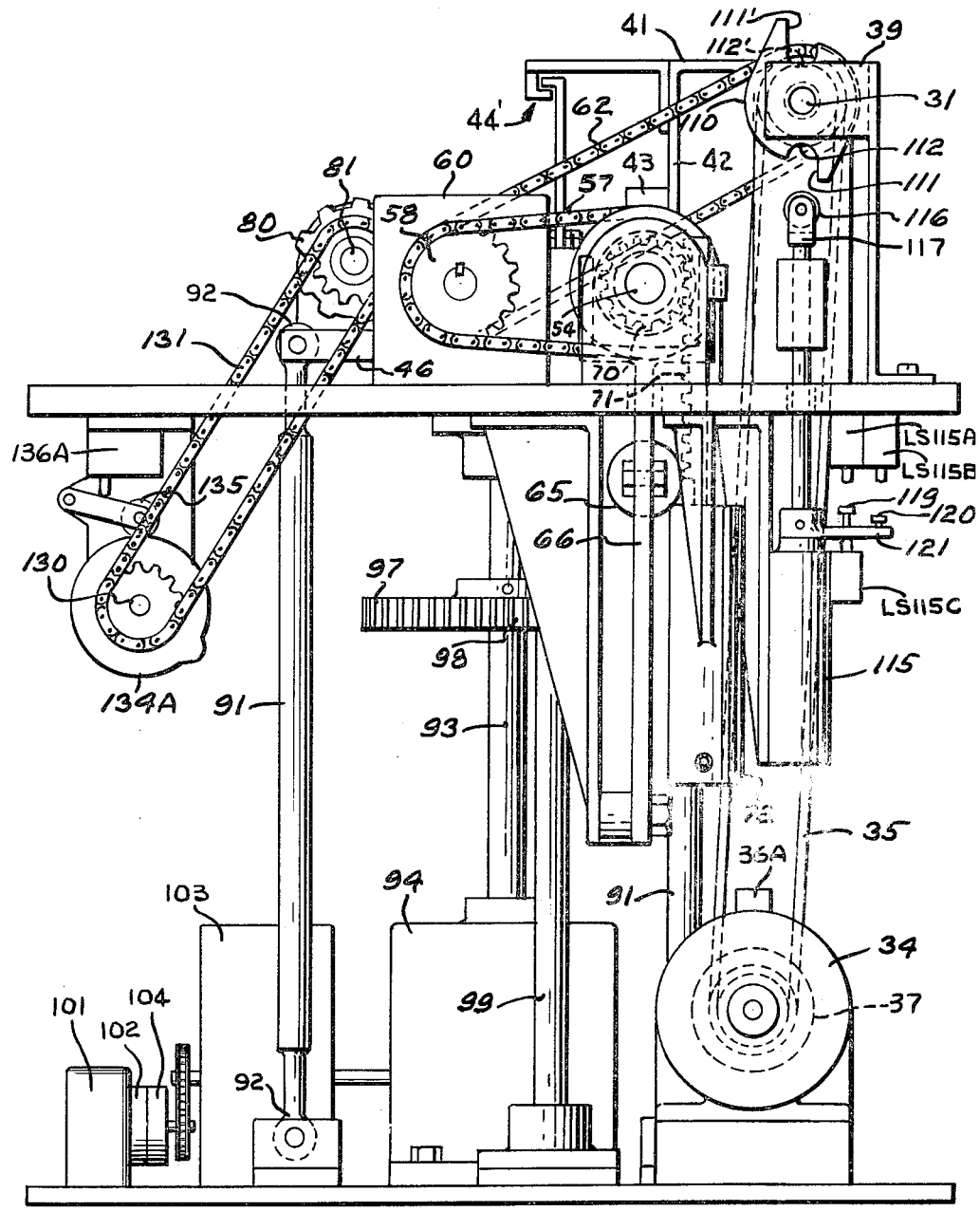
FIG. 3 is a left side view of that apparatus.

The spindle is driven at selected speeds from a motor 34 through a belt-and-pulley transmission 35, as best illustrated in FIGS. 1 and 3. The various speeds are obtained by selective energization of the motor 34 through a conventional high speed winding control 36A and low speed winding control 36B, the desired speed depending on the number of turns to be wound. An electromagnetic brake 37 is provided to stop the rotation of the spindle 31 quickly at predetermined times in the cycle. A presettable electronic counter 38 (FIG. 4) is provided for counting the revolutions of the spindle 31 to initiate various of the operations after preset numbers of turns have been wound on the spools. In the specific example, two six channel counters using magnetic counting circuits with miniature saturable reactors are used in series together with a commercially available pick-up head 39, which produces ten pulses to the counter 38 for each revolution of the spindle 31.

Wire guide mountings

The apparatus for reciprocating the wire guides 30 axially of the spools 20 includes individual support arms 41 (FIG. 4), which are in turn secured to a common carriage 42 at intervals equal to the spacing between adjacent spools 20. The carriage 42 is secured to a bar 43 having a central portion of rectangular cross section and round end portions, the latter being mounted for sliding movement in bearings 44 shown in FIGS. 1 and 2 to permit traversing movement of the wire guides. Rotation of the bar 43, and, hence, of the wire guides, about the axis of the bar 43 is prevented by a slide mechanism generally designated 44' in FIGS. 3 and 4.

The carriage 42 is thus slidably mounted on a support 45 which carries the bearings 44 and the slide mechanism 44'. The support block 45, in turn, is slidably mounted on a base in the form of a flat mounting plate 46 through a suitable dovetail slide mounting 47, as shown in FIG. 1. The sliding movement of the support 45 permitted by the slide construction 47 is in a direction perpendicular to the traversing movement of the carriage 42, and its purpose is to permit the wire guides 30 to be moved along the lengths of the terminal strips 24 of the spools. With this arrangement, the wire guides 30 may be shifted to positions immediately alongside selected ones of the terminals 25, as discussed previously in conjunction with FIG. 9.

Traverse mechanism

Referring to FIGS. 1 and 2, the mechanism for causing the traversing movement of the carriage 42 includes a cam following roller 51 mounted on an extension of the bar 43. A biasing spring 52 urges the carriage 42 to the left, as viewed in FIGS. 1 and 2, such that the roller 51 bears against a developed surface of a rotary traverse cam 53, which controls the axial positioning of the carriage 42 and thus of the wire guides 30. The traverse cam 53 is mounted on a shaft 54, and is driven through a sprocket 56 which is secured to the cam 53 through a sleeve 55. As shown in FIG. 2, the sprocket 56 is connected through a chain 57 to a sprocket 58 which is driven from the output shaft of a speed reducer 59 through an electromagnetic clutch 60 when that clutch is energized. A sprocket 61 on the input shaft of the speed reducer 59 is connected through a chain 62 to a sprocket 63 on the spindle 31.

As the spindle 31 is rotated by the motor 34, the traverse cam 53 rotates at a reduced, synchronized speed through the drive mechanism described immediately above. The cam roller 51, under the influence of the biasing spring 52, rides against the face of the cam 53, causing the carriage 42 and the wire guides 30 to traverse and distribute the wire on the spools 20 as previously described.

Retraction of traverse cam

When the counter 38 stops the rotation of the spindle 31 a few turns before the total number desired for the particular coil, the cam 53 is withdrawn (moved to the left as viewed in FIGS. 1 and 2) from engagement with the cam roller 51. The cam 53 is moved to the left and right by a double-acting air cylinder 65 (FIG. 1) which is controlled by a pair of solenoid valves 65A and 65R. When the "advance" valve 65A is actuated, the piston rod is advanced to the left to pivot a fork 66 about its lower end such that the upper, bifurcated end of the fork 66 is moved toward the left as viewed in FIG. 1. As best seen in FIG. 2, two rollers 67 are carried by the upper end of the fork and are arranged within an annular groove in a collar 68 which is secured to the shaft 54. Accordingly, the advancement of the air cylinder 65 moves the shaft 54 to withdraw the feed cam 53 from operating engagement with the roller 51.

As the traverse cam 53 withdraws, the biasing spring 52 moves the carriage 42 toward the cam 53 until the carriage 42 engages a stop 69 at the left side (FIGS. 1 and 2) of the supporting block 45. The stop 69 is adjustable to regulate the positions of the wire guides 30 to the precise positions typified in solid lines in FIG. 7 and described previously, where the wire lies adjacent to the inner surface of the spool head 23 bearing the terminals 25.

Prior to the time that rotation of the feed cam 53 is to be recommenced for the next winding step, the "retract" solenoid valve 65R is energized to operate the piston rod in the opposite direction to return the cam 53 into contact with the follower 51, and adjustable stop 69' (FIG. 1) being provided for precisely regulating the final operating position of the cam 53 so that the desired limits of traverse are maintained.

Reorientation of traverse cam

Subsequent to the wrapping of wire about a particular set of the terminal posts 25–b, it is preferred that winding of the wire on the spools be recommenced with the wire guides 30 closely adjacent to the spool heads 23, and that normal traversing movement proceed away from the heads 23. Therefore, reorientation of the cam 53 is required, since the winding of the coil may have been interrupted at any point in the cycle of axial reciprocation of the wire guides, and hence with the cam 53 in any angular orientation. More specifically, the low point of the traverse cam 53 is brought into alignment with the cam roller 51 in the illustrative embodiment of the invention where the spool heads bearing the terminals are at the left in FIGS. 1 and 7; however, if the terminals used were on the other spool heads, then the high point on the cam 53 would be brought into alignment with the follower 51 to start traversing movement from right to left from the flanges 22.

In order to reorient the cam 53 to the desired position, a gear 70 (FIG. 2) is freely rotatable on the cam shaft 54. The gear 70 is turned by movement of a rack 71 (FIGS. 1 and 3) in mesh therewith, which is in turn controlled by a double acting air cylinder 72. The cylinder 72 is operated by a pair of solenoid valves 72A and 72R, respectively, to advance and retract the rack 71. As shown in FIG. 2, a lug 74 projects from the hub of the gear 70 and, when the shaft 54 and the collar 68 are in their retracted positions, this lug is engageable with a lug 75 secured to a flange 76 on the collar 68.

While the air cylinder 65 and the fork 66 hold the shaft 54 in its retracted position, the air cylinder 72 is actuated to rotate the gear 70 and the lug 74, which engages and rotates the lug 75 so as to rotate the collar 68, the shaft 54 and the cam 53 toward their normal or starting angular orientations. A stop 77 (FIG. 2) is provided for accurately limiting the rotation of the lugs 74 and 75 and hence of the cam 53.

In order to avoid the possibility of the end face of the lug 75 striking the end face of the lug 74, in the event that they happen to be aligned upon attempted retraction of the cam 53 by the fork 66, the lugs 74 and 75 may be wedge shaped with the facing portions of the lugs comprising parallel, radially extending knife edges. With this arrangement, the lugs will be cammed circumferentially by engagement with each other in the event that they are aligned when the cam 53 is withdrawn. Alternatively, the normal position of the lug 74 may be adjusted such that it lies between the various positions of the lug 75 following the winding of prescribed numbers of turns on the spools according to a particular selected sequence.

Indexing wire guide to wrapping position

Figure 4:
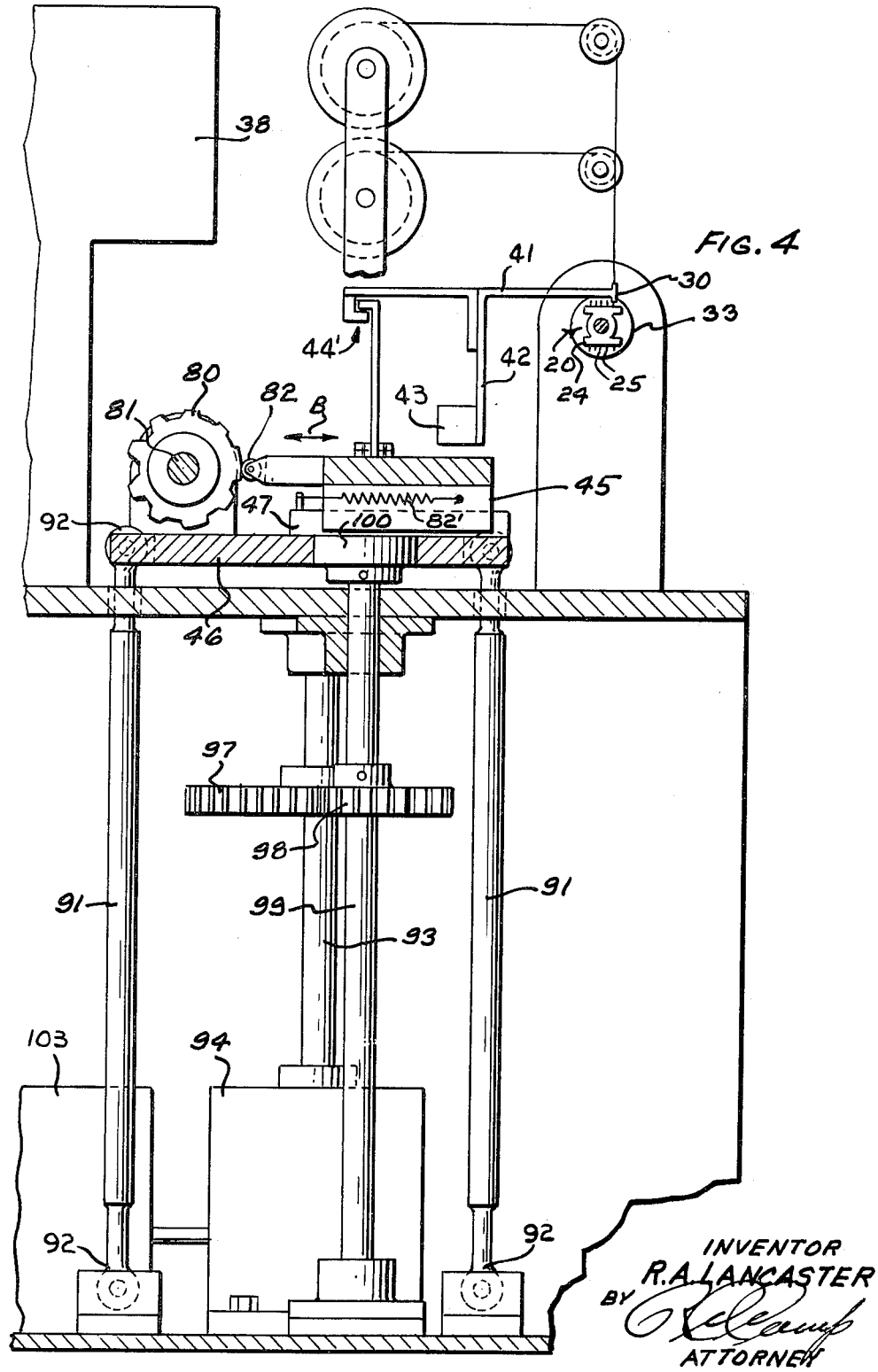
FIG. 4 is an enlarged, fragmentary vertical section taken generally along the line 4—4 of FIG. 2.

Referring to FIGS. 2 and 4, the apparatus for moving the support 45 on the plate comprising the base 46 (according to arrow B in FIGS. 4 and 9 and as previously described) to move the wire guides 30 to the wire wrapping positions adjacent to any selected ones of the terminals, includes an indexing rotary positioning cam 80. The cam 80 is mounted on a shaft 81 in position to cooperate with a cam following roller 82 which is carried by the block comprising the support 45. The entire structure carried by the supporting block 45 is biased to the left in FIG. 4 by a suitable spring 82' such that the cam roller 82 engages the camming surface of the cam 80.

The cam 80 is formed with a circular camming surface and with notches of predetermined depths alternating with portions of the circular surface. The cam 80 is indexed one step (twenty degrees in the specific example) before each coil-winding or terminal-wrapping step. The contour of the cam 80 is specially shaped for each particular program of operation so that a section of the circular surface is presented to the follower 82 before each coil-winding step and so that one of the notches is presented to the follower before each tap-forming operation which requires movement of the wire guide 30 to the left in FIGS. 4 and 9 to a position in alignment with a selected terminal. In the preferred embodiment of the invention, as illustrated in FIGS. 4 and 9, the winding position of the guide 30 is also that used to wrap the wire about the end terminals 1 and 6 (FIG. 10), so that the circular outer surface of the cam 80 is also presented to the follower 82 when either of those two terminals is to be wrapped, and there is no resultant movement of the guide 30 from the winding position. The depths of the notches correspond to the distance from the distributing position of the guide to each selected terminal 25 according to the predetermined program of operation, so as to align the guide 30 with the various terminals in selected sequence.

The cam 80 is indexed one step (1) after each coil-winding operation to align the guide 30 with the selected terminal for wrapping, and (2) after each wrapping operation to a position for either a subsequent winding operation or a subsequent terminal-wrapping operation (where independent coils are to be wound as described previously). The cam 80 must be specially machined for each specific type of coil to be wound and, together with the counter 38, sets the predetermined program of operation as to the order of terminals and number of turns for each coil.

Intermittent rotation of the shaft 81 to index the cam 80 is effected by means of a double-acting air cylinder 83 (FIGS. 1 and 2), which is controlled by a pair of solenoid valves 83A and 83R. When the "advance" valve 83A is energized, the cylinder 83 acts through a conventional ratchet mechanism 85 to turn the shaft 81 through the selected angle (20°) to index the cam 80 to the next position. The actuation of the "retract" valve 83R returns the piston rod of the cylinder 83 to the neutral position in readiness for the next indexing operations of the cam 80 by the air cylinder 83.

Terminal wrapping

After (1) the rotation of the spindle 31 has been interrupted by operation of the counter 38 after the predetermined number of revolutions, (2) the traverse cam 53 has been withdrawn from engagement with the cam roller 51 to move the wire guides 30 to the solid line position of FIG. 7, and (3) the support 45 has been moved to the left in FIGS. 4 and 9 to bring the wire guides 30 alongside selected ones of the terminals 25, the wire guides 30 are revolved about those selected terminals a preset number of turns to wrap the wires extending from the ends of the coils about the terminal posts and thereby provide taps for the coils.

In the preferred embodiment of the invention, the revolution of the wire guides 30 is accomplished automatically by an eccentric mechanism for causing the base or mounting plate 46 to revolve in a fixed attitude through a small circular path (arrow C in FIGS. 8 and 9) to revolve all of the wire guides 30 simultaneously about the selected terminals 25 of the associated spools 20. This is an important feature of the invention, as it is essential to the parallel winding of a relatively large number of coils. With a single and relatively uncomplicated mechanical movement, the apparatus wraps the wires about the selected terminal posts at the proper times in the cycle. The wire guides 30 revolve about the terminals when the base 46 revolves because, as previously indicated, it carries the support 45 through the slide construction 47 and thus supports the carriage 42 and all of the wire guides 30 for simultaneous parallel movement.

Figures 5, 6:
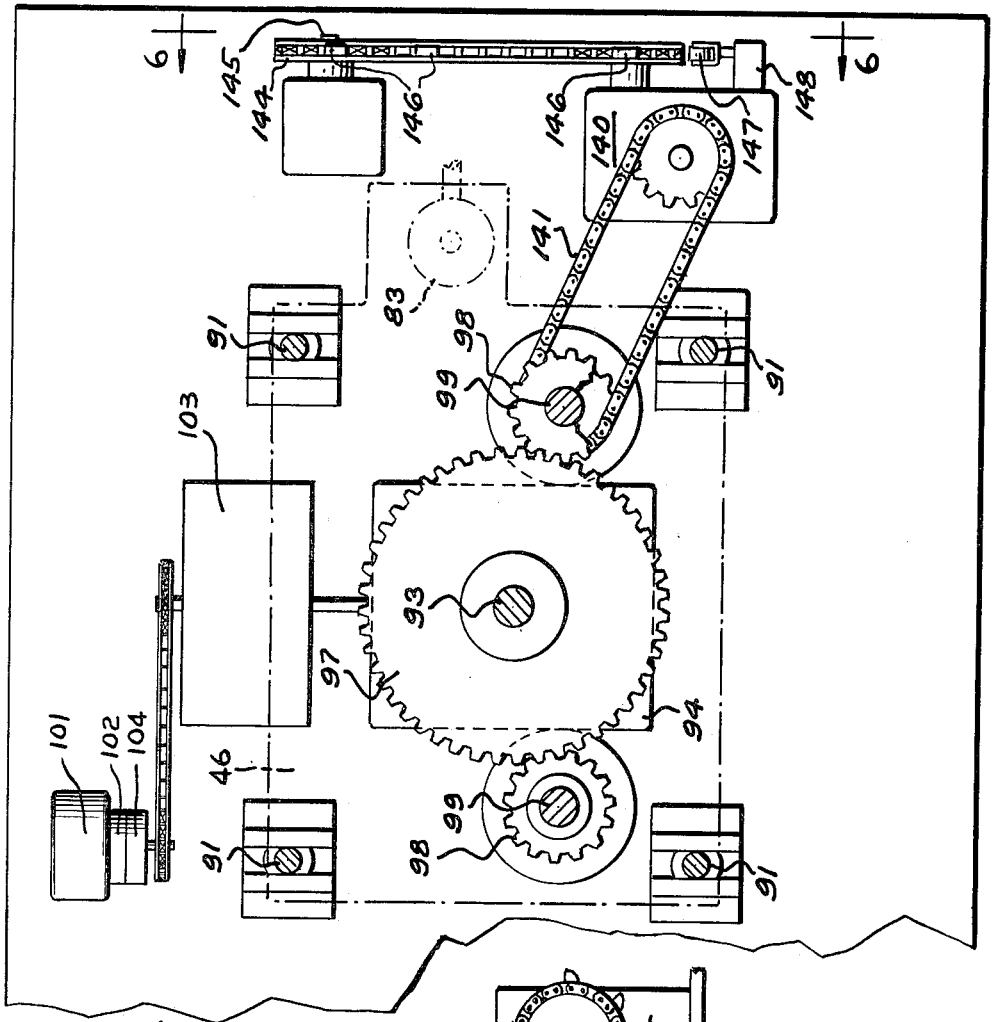
FIG. 5 is an enlarged, fragmentary horizontal section, taken generally along the line 5—5 of FIG. 1 and having portions broken away to reveal structural details.
FIG. 6 is a right-side view of a portion of the apparatus illustrated in FIG. 5, viewed along the line 6—6 of FIG. 5.

The mounting plate 46 is supported by four legs 91, which are universally pivoted at 92, both to the mounting plate 46 and to the frame of the machine, all as best seen in FIGS. 3 and 4. A vertical drive shaft 93 is driven as the output of a commercially available Ferguson indexing unit 94, which is a mechanism performing the equivalent of a geneva-type indexing movement, such that each full revolution of the shaft 93 is followed by a dwell, during which period the unit 94 may be disengaged. The shaft 93 is provided with an upper, fixed bearing 96 (FIG. 1) and carries a gear 97 which engages two gears 98 arranged on corresponding shafts 99, as best illustrated in FIG. 5. These shafts 99 extend upward through suitable fixed bearings and carry a pair of circular eccentrics 100 (FIG. 2) which are received within a corresponding pair of circular openings in the mounting plate 46.

Referring to FIG. 2, it is apparent that rotation of the cams 100 causes a revolving motion of the mounting plate 46 in a fixed attitude through a small circle, which motion is permitted by the universal pivoted connections 92 of the legs 91. The degree of offset or eccentricity of the eccentrics 100 with respect to their shafts 99 is selected to be of such value that the wire guides 30 revolve about the terminals 25 without striking the terminals.

Referring to FIGS. 3 and 5, the Ferguson indexing unit 94 is driven to rotate the eccentrics 100 from a continuously running low speed motor 101 through an electromagnetic clutch 102, a sprocket-and-chain transmission, and a speed reducer 103. An electromagnetic brake 104 is provided to stop the indexing unit 94 quickly when the desired number of revolutions of the plate 46 has been completed.

*Orientation of spools for wrapping*

In order that the wire guides 30 may revolve about a selected terminal 25 and thereby wrap the wire thereabout it is necessary that the spools and the spindle stop their rotation at an accurately predetermined angular orientation with the terminal posts 25–b exactly parallel to the wire guide sleeve 30.

As best illustrated in FIG. 3, an orienting cam 110 is secured to the spindle 31, and is formed with stop edges 111 and 111' facing in the direction of rotation of the spindle 31. To the leading side of the stop edges 111 and 111' are recesses 112 and 112', respectively, the recess 112' being somewhat deeper than the recess 112.

A double-acting air cylinder 115 (FIGS. 1 and 3) is provided, which is selectively actuated by a pair of solenoid valves 115A and 115R. When the "advance" solenoid valve 115A is actuated, the piston rod operates to move a cam roller 116 at the end of a locking pin 117 resiliently against the surface of the cam 110 such that the next stop edge 111 or 111' to reach the position of the cam roller 116 engages the cam roller to stop the rotation of the cam and thus of the spindle 31. The air cylinder 115 is actuated by the counter 38 near the end of the slow-speed rotation of the spindle, specifically with less than one-half revolution remaining. It is thus assured that the cam roller 116 will not engage the wrong stop edge 111 or 111'. This assures that the orienting cam 110 and the spindle 31 will complete the desired number of revolutions and leave the spindle and spools in precisely the desired angular orientation.

For assurance of proper operation, limit switches LS115A and LS115B (FIG. 3) are arranged in the path of adjustable stops 119 and 120 on an arm 121, which is secured to the plunger of the air cylinder 115 such that it moves with the cam roller 116. The stop 120 is so adjusted that the limit switch LS115B is operated only when the cam roller 116 enters the deeper slot 112' but does not operate when the cam roller enters the shallower recess 112. The stop 119 is so adjusted that the limit switch LS115A operates when the cam roller 116 enters either of the recesses 112 and 112'. This selective operation of the limit switches LS115A and LS115B is employed to inhibit further operation of the machine in the event that the cam roller 116 enters the wrong recess, and to initiate further operation of the machine according to the programmed sequence of operation when the cam roller enters the proper recess.

*Program control cams*

Indexing of the cam 80, prior to the start of each individual winding or wrapping step, causes indexing of a program control shaft 130 through a chain 131. A series of cams 134A–134H are mounted on the control shaft 130, which cams operate a series of cam followers 135 and a series of control switches 136A–136H, a typical one of which is illustrated in FIG. 3. The cams 134 are selectively formed for each particular winding pattern, to open and close the various switches 136 at selected angular orientations of the control shaft 130 and, hence, of the shaft 81. The arrangement of the various switches 136 to control the program is described in detail in the section of the application entitled "Circuit Control and Operation."

*Wrapping control*

Referring now to FIGS. 5 and 6, a further mechanical control device is provided, including a gear box 140 which is driven from the righthand shaft 99 of the base 46 through a chain 141 and suitable sprockets, as shown. The output shaft of the gear box 140 carries a sprocket driving a timing chain 144 which is trained about another sprocket mounted on an idler shaft 145. The chain 144 carries adjustable lugs 146 which successively travel into engagement with a roller 147 associated with a limit switch LS148.

The number of revolutions of the wire guides 30 about the selected terminals 25 is controlled by advancement of the control chain 144 and movement of a control lug 146 against the limit switch LS148. Closure of the switch LS148 controls the deenergization of the clutch 94 for the motor 101 to stop the revolution of the wire guides 30. The prescribed numbers of revolutions of the wire guides 30 about the terminals 25 is obtained simply through adjustment of the positions of the lugs 146 along the length of the control chain 144. In practice, the end leads of a coil portion are turned about the associated terminals three or four times, whereas the wire is looped about the intermediate terminals to form tap connections only twice.

CONTROL CIRCUIT AND OPERATION

Figure 13:
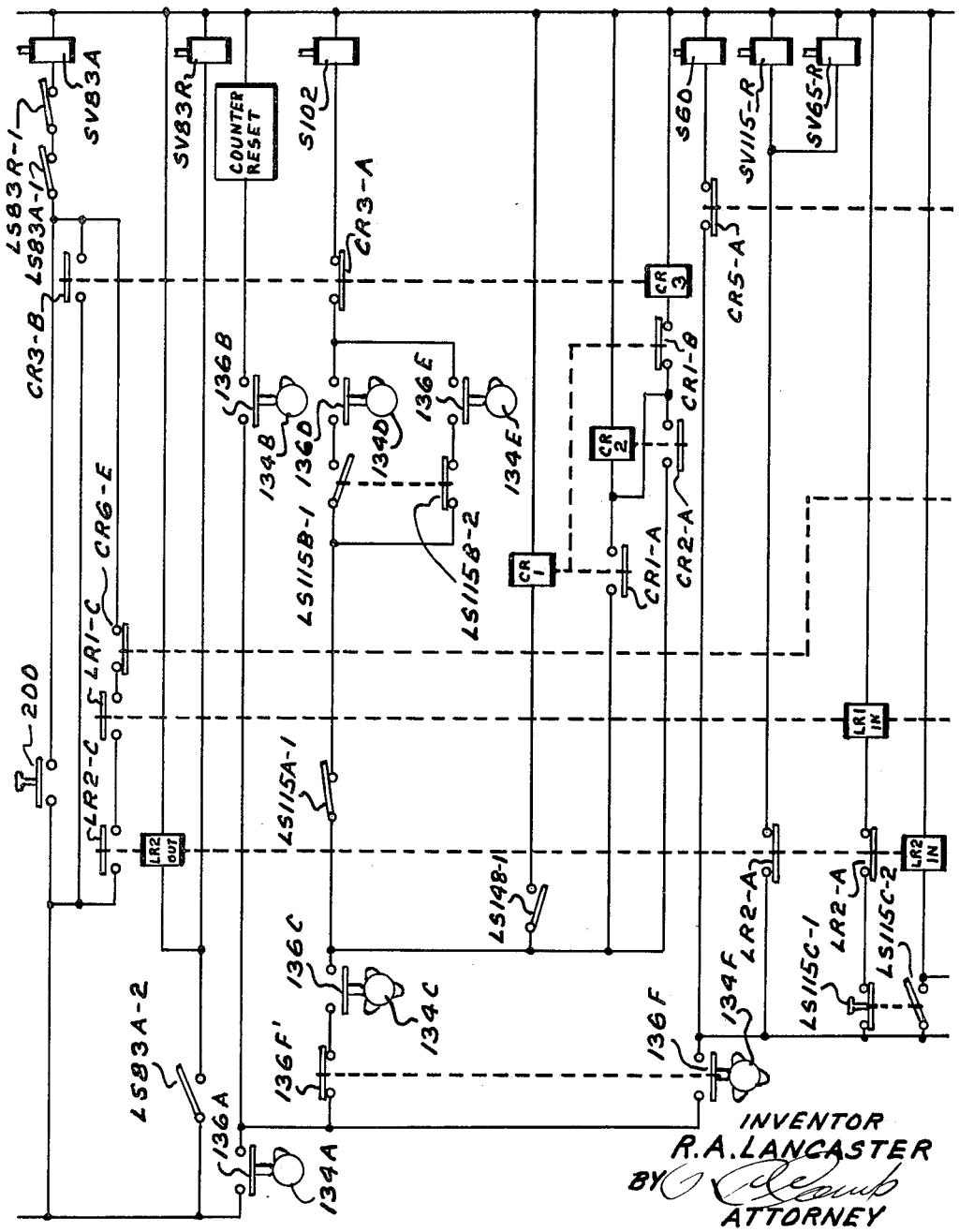

Reference is now made to the simplified control circuit of FIGS. 13 and 14, FIG. 13 preferably being arranged directly above FIG. 14. A push button 200 is provided which, when closed, actuates the solenoid valve SV83A through a pair of closed limit switches LS83A-1 and LS83R-1, as shown. The switch LS83R-1 opens as soon as the solenoid valve SV83A starts advance movement of ratchet 85. However, the air motor 83 is of such character that it completes its advance movement even though the solenoid valve SV83A is thus deactuated.

When the ratchet 85 reaches its upper limit it opens limit switch LS83A-1 and closes an associated limit switch LS83A-2. This closes a circuit to solenoid valve SV83R which initiates return movement of the air motor 83. As soon as the air motor starts its return movement, it reverses the limit switches LS83A-1 and -2, but the air motor nevertheless continues its return movement to the end of its travel limit and recloses the limit switch LS83R-1 in preparation for a succeeding operation. The limit switches LS83A-1 and -2 and LS83R-1 are operated in a conventional manner by the air cylinder 83, and are shown only in the wiring diagram of FIGS. 13 and 14.

This operation of the air motor 83 advances the main control cam shaft 130 through one step, which causes cams 134A, B, and C to close wrapping control switches 136A, B, and C to initiate a wrapping operation. The cam 134A retains the switch 136A closed throughout the complete production of a multiple tapped coil and reopens the associated switch only upon the completion of the coil. The cam 134B closes the switch 136B only during the first operating step of the coil winding operation, its function being to energize the counter reset. This merely assures that the counter will be set at zero at the beginning of a coil winding operation. The cam 134C closes the associated switch 136C at the beginning of each wrapping operation, as opposed to a winding operation.

At the beginning of each wrapping operation, additional cams 134D and 134E (center of FIG. 13) are selectively operated to close corresponding switches 136D and 136E. If the wire is to be wrapped about any of the terminals 1–5 the cam 134D closes the switch 136D, and if the wire is to be wrapped about any of the terminals 6–10 the cam 134E closes the switch 136E. Limit switch contacts LS115B-1 and -2 are operated by the movement of the locking pin 117, the contacts LS115B-1 closing only when the locking pin roller 116 enters the deep recess 112′, and the contacts LS115B-2 being opened only when the locking pin roller 116 enters only the deep recess 112′. It will now be seen that if the locking pin roller 116 enters the wrong recess (contrary to that which the cams 134D and 134E dictate) no power will be furnished to solenoid S102 which controls the electromagnetic clutch 102 and brake 104 and thus the wrapping operation. In the event that limit switch contacts LS115B-1 or LS115B-2 are closed along with the corresponding control switch 136D or 136E, respectively, actuation of the solenoid S102 is permitted only in the further event that the limit switch contacts LS115A-1 are closed, these contacts being closed when the locking pin roller 116 enters either of the recesses.

As soon as the wrapping operation begins, limit switch contacts LS148-1 are closed, by movement of the chain 144 of FIG. 6, to energize a relay CR1 to close contacts CR1-A and to open contacts CR1-B. Closure of the contacts CR1-A causes energization of a relay CR2, which causes contacts CR2-A to lock in the relay CR2 about the contacts CR1-A.

Wrapping of the wire about the selected terminal continues until the limit switch LS148-1 reopens to deenergize the relay CR1. This reopens contacts CR1-A but the relay CR2 remains energized through its own contacts CR2-A. Deenergization of the relay CR1 also recloses contacts CR1-B whereupon another relay CR3 is energized. This opens contacts CR3-A to deenergize the solenoid S102 and stop the wrapping operation.

Energization of the relay CR3 also closes contacts CR3-B. This causes another indexing operation of the cam shaft 130. Since this indexing operation is the same as that initiated by the above-described closure of the push button 200, a description thereof is not repeated. Even in the event that the wrapping operation is to be repeated (about another selected post) the cam 134C momentarily reopens the associated control switch 136C such that the entire wrapping control circuit is momentarily deenergized, thereby causing the relays CR2 and CR3 to drop out.

Assuming that the next operation is to be a winding operation, another control cam 134F closes contacts 136F and opens associated contacts 136F′. The purpose of opening the latter switch is merely to interlock the wrapping circuitry and the winding circuitry so that both cannot be energized simultaneously.

Closing of the switch 136F energizes a solenoid S60 to engage the clutch 60 and thereby to complete the traverse drive by connection of the traversing cam 53 to the spindle 31, although the spindle is not yet being driven.

Closing of the switch 136F also energizes solenoid valve SV115R which retracts the locking pin 117 from the orienting cam 110. Also energized is solenoid valve SV65R which actuates the air cylinder 65 to move the traversing cam 53 into operating engagement with its cam follower 53. One operating coil LR1 (in) of a latching relay is also energized and closes the latching relay contacts LR1-A and opens contacts LR1-B.

When the locking pin 117 is fully retracted through operation of the solenoid valve SV115-R, limit switch contacts LS115C-1 open and limit switch contacts LS115C-2 close. Opening of the limit switch contacts LS115C-1 deenergizes the relay coil LR1 (in) but leaves the contacts thereof in their actuated positions. Closure of the limit switch contacts LS115C-2 energizes one operating coil LR2 (in) of a latching relay such that it opens contacts LR2-A, opens contacts LR2-B and closes contacts LR2-C. Closure of the contacts LR2-C merely conditions a third branch circuit for the subsequent indexing of the control cams upon completion of a winding operation. Opening of the contacts LR2-B serves to deenergize the solenoid valves SV115-R and SV65R. Opening of the contacts LR2-A further opens the circuit of the already deenergized coil LR1 (in) such that the latching relay will not be energized, improperly, at the end of the winding operation, by closure of LS115C-1.

Closure of the limit switch LS115C-2 also energizes a relay CR4 through counter switch contacts CS1A and through the above-mentioned latching relay contacts LR1-A. When the relay CR4 closes its contacts CR4-A, power is applied to the motor 34 through the high speed winding control 36A such that the spindle is driven at high speed.

Energization of the relay CR4 also closes contacts CR4-B and CR4-C. Closure of the contacts CR4-C energizes a solenoid S37 which causes release of the spindle brake 37. Closure of the contact CR4-B energizes the solenoid valve SV72R to return the rack 71 to its normal position, this being the rack which, on its advance stroke, orients the traversing cam 53 to its home position.

Returning to the circuit of CR4, it will be noted that application of power to the relay CR4 also causes energization of timing relay TR1. This opens contacts TR1-A instantaneously which has no immediate effect upon the circuitry.

When the prescribed number of turns has been wound, the counter causes the counter switch CS1-A to open and the counter switch CS1-B to close. Opening of the counter switch CS1-A deenergizes the relay CR4 with the result that contacts CR4-A open to deenergize the high speed winding control 36A. Contacts CR4–B open to deenergize solenoid valve SV72R in preparation for advancement of the rack 72, and contacts CR4–C open such that the spindle brake release is deenergized. The spindle is thus braked rapidly to a stop. Opening of the counter switch CS1–A also deenergizes the time delay relay TR1. However, its contacts TR1–A do not close for a period of approximately four seconds, this being sufficient time to permit the spindle to come to a complete stop.

Closure of the time delay contacts TR1–A causes energization of a relay CR5 since the counter switch CS1–B is closed (by completion of the first high speed wind) and counter switch CS2–A is closed (since the first low speed wind has not been completed). It should be noted at this time that the counter switches, once they have moved to their lower positions, following completion of a high or low speed winding operation, remain in their lower positions until reset by the counter reset 201 referred to above.

Actuation of the relay CR5 opens contacts CR5–A to deenergize solenoid S60 which controls the clutch 60. Opening of the contacts CR5–A thus interrupts the drive of the traversing cam 53. Closing of the time delay contacts TR1–A also actuates solenoid valve SV65A through now closed limit switch contacts LS65B–1. The latter contacts are controlled by the position of the traversing cam, being closed when the cam is in its operating position, to the right in FIG. 2.

Initial retraction of the traversing cam by the air cylinder 65 opens the limit switch contacts LS65B–1. However, the air cylinder is of such character that it completes the retracting movement. Retraction also closes limit switch contacts LS65A–1 such that solenoid valve SV72A is energized to advance the rack 71 to orient the retracted traversing cam 53 to its zero or home position.

When the cam-orienting rack 72 reaches its uppermost position it closes a limit switch LS72A–1 shown immediately below the time delay relay contacts TR1–A. This causes energization of a relay CR6 and closure of contacts CR6–A. This causes energization of the motor 34 through the low speed winding control 36B, causing the spindle to rotate at low speed. Contacts CR6–B are also closed upon energization of the relay CR6. This releases the spindle brake through energization of solenoid S37.

Closure of contacts CR6–C locks the relay CR6 in energized condition through limit switch contacts LS115A–2. Opening of contacts CR6–D temporarily prevents reenergization of the relay CR4, and hence of the high speed winding control 36A. Opening of contacts CR6–E opens the third index controlling circuit for reasons which will subsequently become apparent. Finally, closure of contacts CR6–F causes energization of latching relay coil LR1 (out) to open contacts LR1–A and close contacts LR1–B and LR1–C.

When the slow winding has continued until there is less than ½ turn remaining, the counter switch CS2–A opens and the counter swtich CS2–B closes. Closing of the switch CS2–B applies power through closed counter switch CS3–A and through closed contacts LR1–B to the solenoid valve SV115–A. This advances the locking pin 117 against the orienting cam one pin. It will be noted that since contacts LR1–A are now open, this power is not applied to the relay CR4.

When the locking pin enters either recess in the orienting cam 110, limit switch contacts LS115–A–2 open whereupon the holding circuit for the relay CR6 is opened. This causes relay CR6 to drop out which interrupts energization of the low speed winding control 36B. It also opens contacts CR6–B causing the spindle brake to be applied. It also causes contacts CR6–E to initiate the indexing of the program cams 134 in the same manner as was accomplished by depression of the push button 200.

It should be noted that during the indexing of the program cams, a latch relay winding LR2 (out) is energized to return the LR2 contacts to their initial conditions in preparation for the next winding operation.

Indexing of the cams also opens the cam switch 136F controlling the entire winding circuitry, and causes the cam switch 136C and 136F′ to condition the wrapping circuitry for operation.

It may now be seen that the illustrated embodiment of the invention attains the various indicated objectives.

While various embodiments of the invention have been disclosed, many modifications will be apparent, and it is intended that the invention be interpreted as including all modifications which fall within the true spirit and scope of the invention.

What is claimed is:

1. Apparatus for winding multiple tapped coils, which comprises:
   means for intermittently rotating a headed spool about its axis to draw wire thereon through a wire guide and to form a succession of coil portions on the drum of the spool between the spool heads; and
   means for revolving the wire guide about selected ones of a plurality of terminal posts mounted on a head of the spool, after each coil portion has been wound, to wrap the wire extending from the end of each coil portion about an associated terminal post thereby to provide taps for the coil.

2. The apparatus as recited in claim 1, wherein the revolving means comprises:
   a base on which the wire guide is mounted; and
   eccentric means for causing the base to revolve in a fixed attitude along a small circular path to revolve the wire guide about any selected terminal post.

3. The apparatus as recited in claim 1,
   wherein presettable means are provided for counting the number of revolutions of the spool for each coil portion to provide a predetermined number of turns for each; and
   wherein means are provided, responsive to the counting means, for initiating operation of the revolving means to wrap the wire about a selected terminal post.

4. In combination with coil-winding equipment of the type wherein means are provided for causing relative rotation between a headed spool and a wire guide about the spool axis to draw wire onto the spool through the wire guide, and wherein means are provided for causing relative traversing movement between the spool and wire guide to form a coil on the drum of the spool, apparatus for providing tapped connections on said coil, which comprises:
   means for stopping the relative rotation of the spool and wire guide after the winding of a predetermined number of turns desired for the coil;
   means for moving the spool and wire guide relative to each other along the line of traverse to a rest position where the wire guide is adjacent to a terminal post mounted on a spool head and lying in a plane perpendicular to the axis of the spool; and
   means for revolving the terminal post and wire guide relatively about each other to wrap the wire extending from the end of the coil completely about the terminal post and thereby provide a tap for the coil.

5. The apparatus as recited in claim 4, wherein the revolving means comprises:
   a base on which the wire guide is mounted; and
   eccentric means for causing the base to revolve in a fixed attitude along a small circular path to wrap the wire about the terminal post.

6. In combination with coil-winding equipment of the type wherein means are provided for causing relative rotation between a headed spool and a wire guide about the spool axis to draw wire onto the spool through the wire guide, and wherein means are provided for causing relative traversing movement between the spool and the wire guide to form a coil on the drum of the spool, apparatus for providing tapped connections on said coil, which comprises:
- means for stopping the relative rotation of the spool and wire guide after the winding of a predetermined number of turns desired for the coil;
- means for moving the spool and wire guide relative to each other along the line of traverse to a first rest position where the wire lies adjacent to a first spool head by the time that the rotation is stopped;
- means for moving the spool and wire guide relative to each other in a plane perpendicular to the line of traverse to a second rest position where the wire guide is adjacent to a terminal post mounted on the first spool head and lying in a plane perpendicular to the axis of the spool; and
- means for revolving the terminal post and wire guide relatively about each other to wrap the wire extending from the end of the coil about the terminal post and thereby provide a tap for the coil.

7. In combination with coil-winding equipment of the type wherein means are provided for supporting and rotating a headed spool about its axis to draw wire thereon through a traversing wire guide which encircles the wire, to thereby form a coil on the drum of the spool between the spool heads, apparatus for providing tapped connections on said coil, which comprises:
- means for stopping the rotation of the spool after the winding of a predetermined number of turns desired for the coil;
- means for moving the wire guide along the line of traverse to a first rest position where the wire lies adjacent to the first spool head by the time that the rotation is stopped;
- means for moving the wire guide in a plane perpendicular to the line of traverse to a second rest position adjacent to a terminal post mounted on the first spool head and lying in a plane perpendicular to the axis of the spool; and
- means for revolving the wire guide about the terminal post to wrap the wire extending from the end of the coil about the terminal post and thereby provide a tap for the coil.

8. The apparatus as recited in claim 7, wherein the revolving means comprises:
- a base on which the wire guide is mounted; and
- eccentric means for causing the base to revolve in a fixed attitude along a small circular path to revolve the wire guide about the terminal post.

9. The apparatus as recited in claim 7,
wherein the wire guide comprises a sleeve;
wherein the stopping means terminates the rotation of the spool in an exact angular orientation such that the terminal post is in a predetermined angular orientation; and
wherein the wire guide sleeve is maintained parallel to said predetermined orientation of the terminal post at all times.

10. The apparatus as recited in claim 7,
wherein means are provided to operate repetitively the recited means to form a succession of overlying coils on the drum of the spool such that each coil has an individual predetermined number of turns and each has the wire extending from the end thereof wrapped about a selected one of a group of terminal posts mounted on at least one of the spool heads; and
wherein means are provided for returning the wire guide, before the rotation of the spool for the next coil-winding operation, to a rest position where the wire lies adjacent to the spool head bearing the terminal post about which the wire was last wrapped so that traversing movement for the next coil-winding operation proceeds from that spool head in a direction away therefrom.

11. The apparatus as recited in claim 7,
wherein the supporting and rotating means is adapted to support a spool with a head having a plurality of terminal posts mounted in at least one row thereon;
wherein the wire guide comprises a sleeve of such outer diameter that it may pass readily between adjacent terminal posts in the row to wrap the wire about any selected terminal post in the row; and
wherein the stopping means terminates the rotation of the spool in an exact predetermined angular orientation such that the terminal posts in the selected row are parallel to the sleeve.

12. Apparatus for winding a multiple tapped coil on a headed spool having a group of spaced terminal posts mounted on a first spool head and lying in a plane perpendicular to the axis of the spool, which comprises:
- a spindle on which the spool is mounted for rotation about its axis;
- means for rotating the spindle to rotate the spool so as to draw wire thereon;
- a wire guide which encircles the wire and through which the wire is advanced to the spool;
- means for reciprocating the wire guide axially of the spindle during rotation thereof so that the wire guide traverses across the drum of the spool to wind the wire uniformly on the drum of the spool between the spool heads to form a succession of overlying coil portions on the spool;
- means for stopping the rotation of the spindle after the winding of a predetermined number of turns desired for any one coil portion and with the spindle oriented so that a selected terminal post associated with that coil is parallel to the wire guide;
- means for causing movement of the wire guide along the line of traverse to a first rest position adjacent to the first spool head shortly prior to the time that the rotation is stopped so that the wire extends from the wire guide to the spool along a line parallel to and closely adjacent to the first spool head;
- means for moving the wire guide perpendicular to the line of traverse to a second rest position adjacent to the selected terminal post for the particular coil portion;
- means for revolving the wire guide about the selected terminal post to wrap the wire extending from the end of the particular coil portion about that post and thereby to provide a tap for that coil; and
- means for returning the wire guide to the first rest position adjacent to the first spool head before the rotation of the spindle for the next coil-winding operation.

13. The apparatus as recited in claim 12,
wherein the means for rotating the spindle comprises:
- (A) means for rotating the spindle at a relatively high speed during the major portion of the winding of a coil portion, and
- (B) means for rotating the spindle at a relatively slow speed during the last few turns; and
wherein means are provided for temporarily interrupting the rotation of the spindle when only a few turns remain to be wound and for switching from high speed to low speed after a short time delay, the means for moving the wire guide to the first rest position operating during said time delay and before the low-speed rotation commences.

14. The apparatus as recited in claim 12,
wherein means are provided for resetting the reciprocating means during each tap-forming operation, such that subsequent traversing movement of the wire guide when the spindle recommences rotation begins with the wire guide adjacent to the first spool head and proceeds in the direction away from that spool head.

15. Apparatus for winding a multiple tapped coil on a headed spool having a group of spaced terminal posts mounted on a first spool head and lying in a plane perpendicular to the axis of the spool, which comprises:
- a horizontal spindle on which the spool is mounted for rotation about its axis;
- means for rotating the spindle to rotate the spool so as to draw wire thereon;
- a wire guide which encircles the wire and through which the wire is advanced to the spool;
- a carriage on which the wire guide is secured;
- means for reciprocating the carriage axially of the spindle during rotation thereof so that the wire guide traverses across the drum of the spool to wind the wire uniformly on the drum of the spool between the spool heads to form a succession of overlying coil portions on the spool;
- means for stopping the rotation of the spindle after the winding of a predetermined number of turns desired for any one coil portion and with the spindle oriented so that a selected terminal post associated with that coil is parallel to the wire guide;
- means for causing movement of the carriage parallel to the spindle to move the wire guide along the line of traverse to a first rest position adjacent to the first spool head shortly prior to the time that the rotation is stopped so that the wire extends from the wire guide to the spool along a line parallel to and closely adjacent to the first spool head;
- a support on which the carriage is mounted for constrained horizontal movement in a direction perpendicular to the spindle;
- means for moving the support perpendicular to the spindle to move the wire guide perpendicular to the line of traverse to a second rest position adjacent to the selected terminal post for the particular coil portion;
- a revoluble base on which the support is mounted for constrained horizontal movement perpendicular to the spindle;
- eccentric means for causing the base to revolve in a horizontal plane while maintaining a fixed attitude, through a small circular path to revolve the wire guide about the selected terminal post to wrap the wire extending from the end of the particular coil portion about that post and thereby provide a tap for the coil;
- means for stopping the revolution of the plate after the formation of each tap; and
- means for moving the support to return the wire guide to the first rest position adjacent to the first spool head before the rotation of the spindle for the next coil-winding operation.

16. The apparatus as recited in claim 15,
wherein the reciprocating means for the wire guide comprises:
- (A) a rotary cam having a developed surface designed to provide uniform reciprocation of the wire guide between the spool heads,
- (B) a cam follower on the carriage for engaging the developed surface of the cam, and
- (C) means for biasing the carriage toward the cam so that thhe cam follower engages the cam; and wherein the means for causing movement of the carriage to the first rest position comprises
- (A) apparatus for retracting said cam from contact with the cam follower shortly prior to the time that the spindle stops rotating so that the cam no longer controls movement of the carriage and the carriage moves toward the retracting cam under the influence of the biasing means, and
- (B) a stop for arresting the movement of the carriage toward the retracting cam at the first rest position where the wire guide is adjacent to the first spool head.

17. The apparatus as recited in claim 16,
wherein means are provided for resetting the rotary cam, during the time that the cam is out of contact with the follower, by turning it to such an angular position that subsequent traversing movement of the wire guide, when the cam has been returned to engagement with the follower and the spindle recommences rotation, begins with the wire guide adjacent to the first spool head and proceeds in the direction away from that spool head.

18. The apparatus as recited in claim 15,
wherein the terminal posts are arranged in a row, spaced apart and parallel to each other, on at least one elongated terminal strip on the first spool head;
wherein the stopping means terminates the rotation of the spool in an exact angular orientation such that the terminal posts in the row are vertical;
wherein the wire guide is tubular in form and mounted vertically on the carriage so as to be parallel to the row of terminal posts when the rotation of the spool terminates; and
wherein the means for moving the wire guide to and from the second rest position comprises
- (A) a rotary cam rotatably mounted on the base and having a circular camming surface with consecutive notches of predetermined depths alternating with portions of the circular surface,
- (B) a cam follower on the support for engaging the camming surface,
- (C) means for biasing the support toward the cam so that the cam follower engages the camming surface, and
- (D) means for indexing the cam in steps so that a section of the circular surface is presented to the cam follower before each coil-winding operation and so that the notches are successively presented to the cam follower before each tap-forming operation to align the wire guide with a selected terminal post in the row for each successive wrapping operation, the depth of the notches corresponding to the positions of the terminal posts according to a predetermined program of operation.

19. Apparatus for simultaneously winding a plurality of identical multitap coils on a plurality of headed spools, each having a group of identically spaced terminal posts mounted on a first spool head and lying in a plane perpendicular to the axis of the spool, which comprises:
- a spindle on which the spools are mounted in a row, with the first spool heads all facing the same direction, for simultaneous rotation about their axes;
- means for rotating the spindle to rotate the spools so as to draw wire thereon from individual supplies;
- a plurality of parallel wire guides which encircle the wires and through which the wires are advanced to the spools, the wire guides being associated one with each spool and being spaced the same distance apart as the spools;
- means for reciprocating the wire guides, as a unit, axially of the spools during rotation thereof so that the wire guides traverse across the drums of the spools to wind the wires uniformly on the drums of the spools between the spool heads to form an identical succession of overlying coil portions on each spool;
- means for stopping the rotation of the spindle after the winding of a predetermined number of turns desired for any one coil portion on each spool so that a selected post on each spool, corresponding to that coil portion, is parallel to the associated wire guide;
- means for causing movement of the wire guides, as a unit, along the line of traverse to first rest positions adjacent to the associated first spool heads shortly prior to the time that the rotation of the spindle is stopped so that the wires extend from the wire guides to the spools along parallel lines parallel to and closely adjacent to the first spool heads;

means for moving the wire guides, as a unit, in parallel planes perpendicular to the line of traverse to second rest positions adjacent to the selected terminal posts for the particular coil portions;

means for revolving all of the wire guides, as a unit, about the associated selected terminal posts to wrap the wire extending from the end of each particular coil portion about the selected post and thereby to provide a tap for that coil portion; and means for returning the wire guides, as a unit, to the first rest positions adjacent to the first spool heads before the rotation of the spindle for the next coil-winding operation.

20. The apparatus as recited in claim 19,
wherein all of the wire guides are mounted on a single flat mounting plate for the recited linear movements; and
wherein the revolving means comprises eccentric means for causing the mounting plate to revolve in a fixed attitude along a small circular path to revolve all of the wire guides, as a unit, about any selected terminal posts on the associated spools.

21. The apparatus as recited in claim 19,
wherein a presettable counter is provided for counting the number of revolutions of the spindle;
wherein means responsive to an output signal from said counter are provided to actuate the stopping means automatically after the desired number of turns for each coil section;
wherein means responsive to a signal from said counter indicative of only a few turns remaining to be wound on said spools are provided to automatically actuate the means for causing movement of the wire guides to the first rest positions; and
wherein means responsive to the completion of the preceding operations are provided to operate automatically to initiate cycling of the aforesoid wire guide moving means, the wire guide revolving means, and the wire guide returning means so that the entire operation is automatic according to a programmed pattern of operation.

References Cited by the Examiner

UNITED STATES PATENTS

| | | | |
|---|---|---|---|
| 2,246,143 | 6/1941 | Patton | 242—9 |
| 2,521,795 | 9/1950 | Kelley | 242—1 |
| 2,862,670 | 12/1958 | Mallina | 242—7 |
| 2,963,051 | 12/1960 | Shaw et al. | 140—93 |
| 3,019,822 | 2/1962 | Jacobson | 140—71 |
| 3,131,371 | 4/1964 | Brekke et al. | 242—125.2 X |

WHITMORE A. WILTZ, *Primary Examiner.*

ARTHUR M. HORTON, JOHN F. CAMPBELL,
*Examiners.*